United States Patent

[11] 3,545,776

[72] Inventor Girard S. Haviland
West Hartford, Connecticut
[21] Appl. No. 738,020
[22] Filed June 18, 1968
[45] Patented Dec. 8, 1970
[73] Assignee The Jacobs Manufacturing Company
West Hartford, Connecticut
a corporation of New Jersey

[54] COMBINED CHUCK SPINDLE AND CHUCK LOCKING COLLAR
6 Claims, 7 Drawing Figs.

[52] U.S. Cl..................................................... 279/63,
77/60, 77/7; 32/26; 128/310
[51] Int. Cl.......................................................... B23b 31/06
[50] Field of Search............................................ 77/6, 7, 60;
279/56, 63, 1(K); 128/310; 32/26; 192/18, 48.5,
48.6, 48.92; 145/76

[56] References Cited
UNITED STATES PATENTS
2,292,228  8/1942  Krieger............................ 145/76
2,716,555  8/1955  Rowe............................... 77/7
2,924,317  2/1960  Holsten........................... 192/48.92X
3,237,955  3/1966  McCarthy et al. ............. 279/63

Primary Examiner—Francis S. Husar
Attorney—Stephen J. Rudy

ABSTRACT: A portable power drill having a driving spindle carrying a keyless slidable jaw chuck provided with a jaw-actuating unit which is selectively rotatable while the spindle is held stationary to adjust a set of jaws to open or closed condition. A locking collar limited to axial sliding movement along the body of the chuck and restrained against relative rotation has a spring biased normal position locking the jaw-actuating unit against rotation in a reverse direction relative to the chuck body so as to prevent loosening of the jaws during reverse operation or reverse actions of the chuck, but allowing rotation of the unit in a positive direction for maintaining the tightness of the jaws during operation of the tool. The collar has a manually moved position against the spring bias free of the unit, in which position the collar is in locking relation with the casing of the tool preventing rotation of the driving spindle. The extent of the movement required to shift the collar from one locking position to the other is limited so that it can be effected with one hand and while the hand remains in full gripping relation with the jaw-actuating unit.

PATENTED DEC 8 1970

3,545,776

INVENTOR
GIRARD S. HAVILAND
BY
Stephen J. Rudy
ATTORNEY

COMBINED CHUCK SPINDLE AND CHUCK LOCKING COLLAR

BACKGROUND OF THE INVENTION

This invention relates to the art of keyless chucks for rotary power tools wherein the jaws of the chuck are movable to open or closed condition, accordingly, as a jaw-actuating unit is rotated in one direction or the other.

While the chuck of the present invention is subject to various industrial applications, it is especially suited as a component of a portable power tool having use in applications where the drill bit is subject to being operated selectively in a forward or reverse direction, and in applications where the work tends to "grab" the bit. Applications of this nature are found especially in bone surgery work.

During bone surgery operations, it is often necessary to employ a portable power drill to bore holes into the bone. The nature of bone material is such that it will often tend to "grab" the bit. While the conventional chuck has a natural tendency to maintain its jaws tightly gripped about the work bit when driving in a positive direction, a sudden reverse torque force created by "grabbing" of the bit may cause the usual jaw-actuating unit to loosen the jaws. It is also often necessary in such work for the drill to be driven in a reverse direction, but this is fraught with difficulties because of the natural tendency of the jaw-actuating unit in conventional chucks to loosen the chuck jaws when the tool is operating in a reverse direction. These faults cause loss of valuable time required to retighten or to determine the looseness of the chuck jaws.

During bone surgery, it becomes necessary at times to replace the work bit with another. This will require the driving spindle to be restrained in some manner so as to permit relative rotation of the usual jaw-actuating unit to loosen and subsequently retighten the chuck jaws. The use of the surgeon's hands, as well as his time, is limited. It is desired that the process of tightening or loosening the jaws be accomplished with his free hand while the other hand holds the drill handle in usual manner, and that it be done without the necessity of changing the position of the hand holding the drill.

The general objective of the present invention is to provide a rotary tool with a chuck, the jaws of which will be positively locked from becoming loose whether the chuck is driven in a positive or reverse direction; and in which mechanism is provided for selectively locking the driving spindle against rotation to permit relative rotation of the jaw-actuating unit to adjustably tighten or loosen the jaws.

This objective is accomplished in the present invention by means of a locking collar limited to axial slidable movement along the body of the chuck between an end of the tool's casing and an end of the jaw-actuating unit. To positively lock the jaw-actuating unit against rotation relative to the chuck jaws, the collar has ratchet teeth in a face thereof normally engaged under a spring load with complementary teeth on the jaw-actuating unit. To positively lock the driving spindle so as to enable relative rotation of the jaw-actuating unit, the collar is axially slidable out of engagement from the unit against the spring load to engage lugs on the opposite face of the collar with slots in an end face of the casing. An advantage of the arrangement of the collar relative to the casing and to the jaw-actuating unit is that the usually free hand of the operator may be used to shift the collar from one position to the other without requiring the other hand to be lifted from the handle of the tool. A further advantage of the particular structure of the locking collar is that it results in a more simplified and lighter weight tool than would otherwise be possible.

DETAILED DESCRIPTION OF A PREFERRED EMBODIMENT OF THE INVENTION

Figure 1:
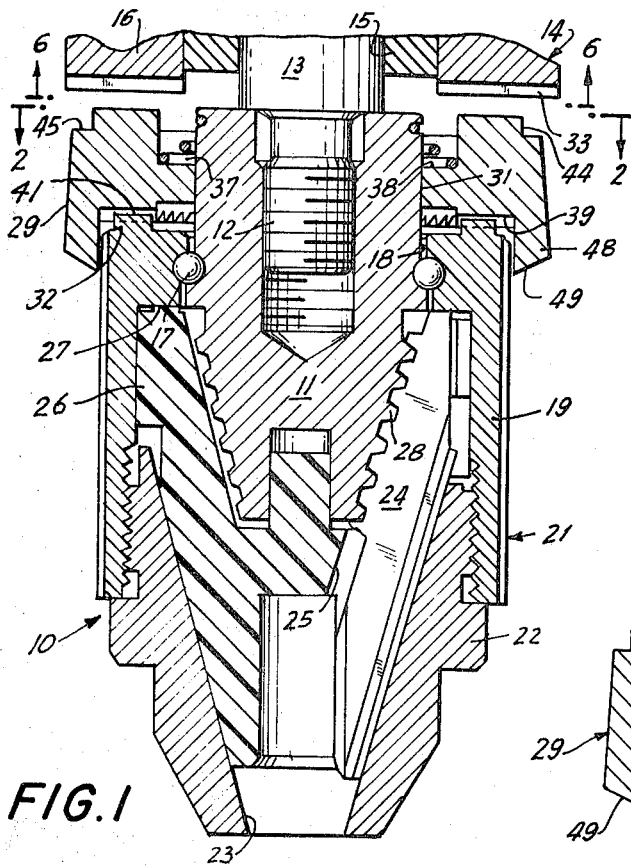
FIG. 1 is a longitudinal section showing the invention associated with a keyless chuck carried by a rotary power tool, and showing the locking collar in its normal position in locked relation to the jaw-actuating unit of the chuck.

In the drawings is disclosed a conventional slidable jaw keyless chuck 10 having a tapered screw body 11 axially fixed by means of a threaded connection 12 to a motor driven spindle 13 of a portable tool generally indicated at 14. The spindle is supported for rotation in the usual bearing 15 relative to the casing 16 of the tool. Coaxially mounted and retained by means of a ring of ball bearings 17 upon a cylindrical peripheral portion 18 of the chuck body 11 for relative rotation is a sleeve member 19 of a chuck jaw-actuating unit 21. Threadedly fixed in the front end of the sleeve is a nosepiece 22 having a coned interior recess 23 through which a usual set of three chuck jaws 24 (one being shown) are movable to open or closed condition. The jaws are guided in their movement by means of grooves or tracks 25 formed in a jaw guide member 26. The latter is held fixed in the coned recess 23 of the nosepiece under pressure of an internal shoulder 27 of the sleeve. The tracks 25 are inclined forwardly and downwardly, converging in the usual manner toward a common point. The jaws 24 have a threaded engagement 28 with the tapered screw portion of the chuck body 11. The jaw-actuating unit 21 is defined by the sleeve 19, nosepiece 22 and jaw guide 26. When the jaw-actuating unit is rotated relative to the chuck body 11, the jaws are carried with it and are caused to threadedly ride along the chuck body. The jaws are guided in this movement by the tracks 25 to open or closed condition, accordingly, as the unit is rotated in one direction or the other. The sleeve 19 is manually gripped by the operator to effect rotation of the unit. The surface of the sleeve is knurled or serrated to afford a nonslip grip for the operator.

When attempting to rotate the jaw-actuating unit to obtain a gripping condition of the jaws about a work bit or to release the jaws from a gripping condition, there is a tendency, because of the frictional relation of the threads of the jaws to the screw portion of the chuck body, for the spindle 13 and the chuck body 11 fixed to the spindle to also rotate with the jaw-actuating unit. As a consequence, difficulty will be experienced in tightening or releasing the jaws relative to the work bit unless the spindle and chuck body are held stationary to permit relative rotation of the jaw-actuating unit.

There is an inherent tendency for the jaw-actuating unit to tighten its grip during any normal forward rotation of the tool. This tendency to tighten is created by the resisting torque of the tool which tends to make the jaw-actuating unit rotate behind the spindle, thus increasing the grip of the jaws on the work bit. There are situations in drilling, and especially in using burrs or small milling cutters, where torsional chatter actually reverses the lagging tendency of the jaw-actuating unit causing it to spin ahead of the spindle with a resulting loosening. This loosening tendency of the jaw-actuating unit is also experienced when the chuck is driven in the reverse direction.

The foregoing operational difficulties are avoided in the present invention by means of a manipulative combined spindle locking and chuck locking collar 29. The latter is limited to axial sliding movement on a rearwardly extending section 31 of the chuck body relative to a rear end wall 32 of the sleeve 19 and relative to an opposed end wall 33 of the tool's casing. The chuck body section 31 may be splined or multisided. Here, it is squared, as indicated in FIG. 2. The collar 29, as best seen in FIGS. 1—4, has an axial opening 34 having a configuration complementing that of the body section 31. Here, it is shown as being of generally square configuration defined by an opposed pair of straight sides 35 connected by a pair of opposed radiused sides 36. The collar slidably sleeves over section 31 of the chuck body which has a configuration complementing that of the collar opening 34. By means of this construction, the collar is limited to axial movement relative to the chuck body, and is restrained against relative rotation.

Figure 2:
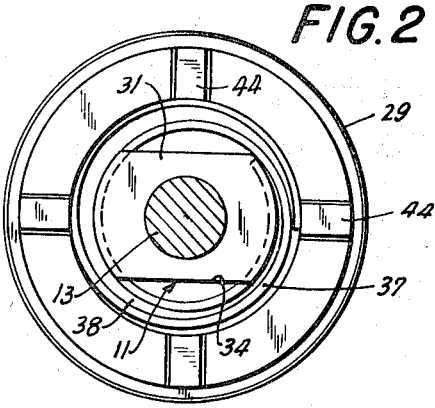
FIG. 2 is a section on line 2—2 of FIG. 1.
Figure 5:
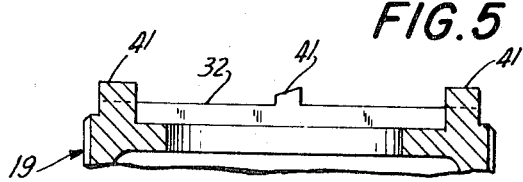
FIG. 5 is a fragmentary detail of the rear portion of the sleeve member of the jaw-actuating unit.

A conical compression spring 37, anchored at its smaller diameter end in a peripheral groove of section 31 of the chuck body, and at its other end abutting a recessed wall 38 of the collar, yieldably holds the collar in a forward normal position, as in FIG. 1. In the latter position, a ring of teeth 39, formed about a forward recessed face of the collar, is engaged by a group of teeth 41 (FIGS. 1, 5) here four in number, projecting from the opposed end wall 32 of the sleeve. The ring of teeth 39 is concentric with the axis of the chuck body; the teeth are spaced equally apart, and are of ratchet form. Each of the teeth 39 is defined (FIG. 3) by a shoulder 42 and by a land 43 declining from the crest of the shoulder to the base of the next succeeding shoulder. The cooperating teeth 41 of the sleeve complement the ratchet teeth and are spaced equally apart in concentric relation to the axis of the chuck body.

The ratchet teeth 39 of the collar and the teeth 41 of the sleeve are so arranged that in the normal spring loaded condition of the collar, as in FIG. 1, the sleeve teeth are cooperable with the shoulders 42 of the collar teeth to lock the jaw-actuating unit 21 against rotation relative to the chuck body in a reverse or loosening direction, and the sleeve teeth 41 are adapted to ride or ratchet over the collar teeth 39 upon rotation of the jaw-actuating unit in a positive or tightening direction relative to the chuck body.

Figure 7:
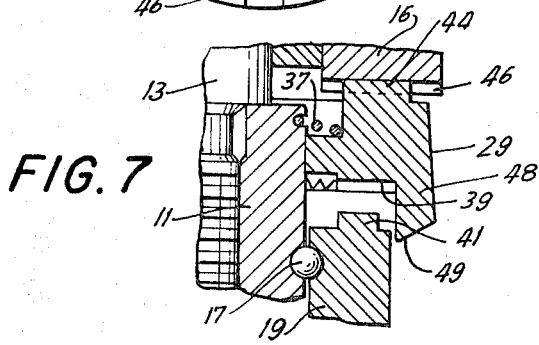
FIG. 7 is a fragmentary section of FIG. 1 but showing the locking collar axially shifted from its position in FIG. 1 into locked relation with the casing of the tool.

The collar 29 may be manually moved axially along the chuck body section 31 to disengage its teeth from those of the sleeve and to carry a group of lugs 44, here four in number, extending from a rear annular face 45 into locking relation with complementary slots 46 formed in the opposed end wall 33 of the casing, as indicated in FIG. 7. In this shifted condition of the collar, the unitary spindle and chuck body 13, 11 are held locked by the collar to the casing 16 against rotation relative to the casing. While the spindle and chuck body are thus held locked, the jaw-actuating unit 21 may be manually rotated relative to the chuck body as needed to effect adjustment of the jaws to open or closed condition. When the collar is manually released, the spring 37 will return it to its normally locked condition with the sleeve 19 so as to relock the jaw-acutating unit 21 against rotation in a reverse direction relative to the chuck body.

The particular construction of the collar 29 and its mode of association with the chuck and the casing of the tool is such that manual shifting of the collar from one locking position to the other may be accomplished with the free hand of the operator while his other hand remains in its usual position holding the casing of the tool stationary.

Figure 3:
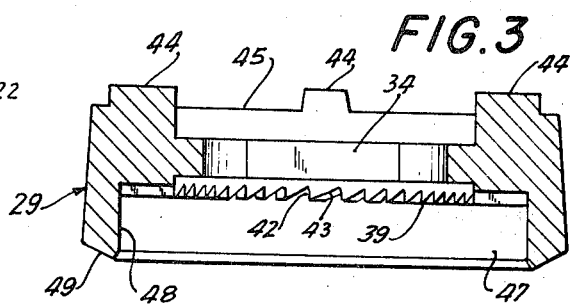
FIG. 3 is an enlarged detail in cross section of the locking collar.
Figure 6:
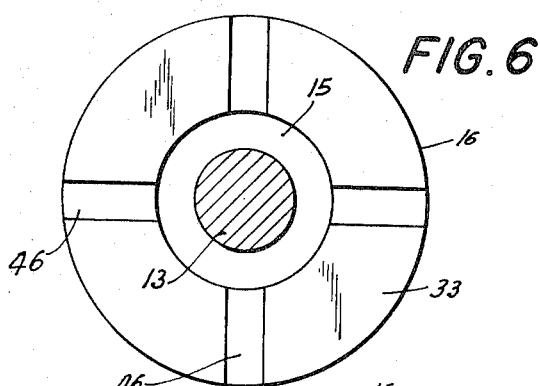
FIG. 6 is a section on line 6—6 of FIG. 1.
Figure 4:
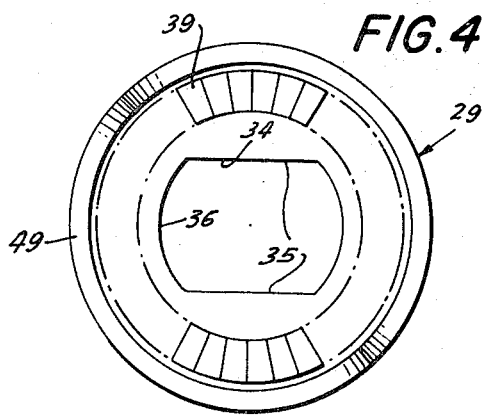
FIG. 4 is a detail of the ratchet toothed face of the locking collar.

The ratchet teeth 39 of the collar are formed at the bottom of an annular recess 47 (FIG. 3). In the normal position of the collar, as in FIG. 1, an annular sidewall or skirt 48 defining the recess 47 surrounds with a slight clearance a marginal rear portion of the sleeve 19. The end wall 49 of the collar is radially thickened so that when the operator's hand grasps the sleeve of the jaw-actuating unit for purposes of adjusting the jaws, the side of his hand may be pressed axially against the end wall 49 so as to slide the collar axially to engage its lugs 44 with the slots 46 of the casing. To bring the lugs of the collar in register with the slots of the casing, the operator causes the chuck to be rotated slightly to this end as he simultaneously grips the sleeve and slides the collar axially. The axial distance that the collar must be shifted from its normal position into locking engagement with the tool's casing is relatively shorter than the width of the operator's hand. Here, it corresponds substantially to the extent that the skirt 48 of the collar overlies the sleeve 19, as can be gathered from FIGS. 1 and 7. By means of this construction, following axial movement of the collar away from the sleeve, the sleeve will nevertheless be subject to the full grip of the operator's hand for adjustable rotation of the jaw-actuating unit while the side of the operator's hand continues to hold the collar against the bias of the spring 37 in locking engagement with the casing. When the operator's hand is released from the sleeve, the collar is returned by the spring 37 to its normal locking relation with the sleeve.

It is apparent that while the operator's free hand is rotatively manipulating the jaw-actuating unit and axially sliding the collar, his other hand is not required to be moved and may remain in its usual position holding the casing of the tool.

I claim:

1. In a rotary power tool including a casing adapted to be manually held, a driving spindle rotatably supported in the casing having an end projecting externally of the casing, a keyless chuck having a chuck body rigid with the end of the spindle, a jaw-actuating unit mounted upon the chuck body in fixed axial spaced relation to the casing having rotation relative to the chuck body, a locking collar manually slidable upon the chuck body axially between the unit and the casing and restrained against rotation relative to the chuck body, the collar having at each end a locking face and the casing and unit each having a locking face complementing a separate one of the faces of the collar, the collar having a normal position free of the casing in which one of its faces has an interlocking relation with the locking face of the unit so as to lock the latter against rotation in one direction but not in the other, and the collar having an axially moved position free of the unit in which the other of its locking faces has an interlocking relation with the locking face of the casing so as to lock the body against rotation in both directions relative to the casing, and spring means normally biasing the collar in its normal position.

2. In a rotary power tool including a casing adapted to be manually held, a driving spindle rotatably supported in the casing having an end projecting externally of the casing, a keyless chuck body rigid with the end of the spindle and having a chuck jaw-actuating unit, bearing means mounting the unit upon the chuck body for relative rotation in a fixed position spaced axially from the casing, a locking collar manually slidable upon the chuck body axially between the unit and the casing and restrained against rotation relative to the chuck body, the collar having a normal position free of the casing in locking engagement with the unit locking the unit against rotation in a reverse direction relative to the chuck body but allowing rotation of the unit in a forward direction relative to the chuck body, the collar having an axially moved position free of the unit in locking engagement with the casing locking the chuck body against rotation relative to the casing, and spring means normally biasing the collar in its normal position, wherein the collar has a ring of ratchet teeth formed on an end face thereof, the unit has at least one complementary tooth engageable by one of the the ratchet teeth in the normal position of the collar so as to lock the unit against rotation in a reverse direction relative to the chuck body but allowing ratcheting of the complementary tooth over the ratchet teeth upon rotation of the unit in a forward direction relative to the chuck body, the casing has at least one slot in its surface, and the collar has at least one projecting lug adapted for locking engagement with the slot in the axially moved position of the collar so as to lock the collar and as a consequence the chuck body against rotation in either direction relative to the casing.

3. In a rotary power tool as in claim 2, wherein the collar is slidable from its normal position to its moved position over a relatively short distance substantially less then the width of the operator's hand, and the collar is of greater diameter than the unit so as to provide an annular portion projecting radially beyond the unit adapted to be abutted by a side of the operator's hand to force the collar axially into locking engagement with the casing and held in locked engagement with the casing while the operator's hand simultaneously manipulates the unit rotatively.

4. In a rotary power tool as in claim 2, wherein the collar has a forwardly extending radially thickened annular wall freely overlying a marginal end portion of the unit in the normal position of the collar, and the distance the collar is required to be moved axially from its normal position to its moved position in locking engagement with the casing corresponds substantially to the extent that the annular wall overlies the unit so that the annular wall may be abutted and forced axially to its moved position by an edge of the operator's hand and so held while the hand of the operator remains in full gripping relation with the unit for rotative manipulation of the latter.

5. In a rotary power tool as in claim 2, wherein the collar has an axial opening of squared configuration in which a portion of the chuck body having a complementary configuration is slidably received.

6. In a rotary power tool including a power driven shaft, a casing supporting the shaft for relative rotation, a chuck member carried by the shaft in axially spaced relation to the casing having rotation relative to the shaft, and a locking collar slidably axially upon the shaft between the chuck member and the casing, latching means upon a forward face of the collar and upon an opposite face of the chuck member for engaging one another so as to lock the chuck member against rotation in one direction but not in the opposite direction, latching means upon a rear face of the collar and upon a forward face of the casing for engaging one another so as to lock the shaft against rotation relative to the casing, the collar having a normal position upon the shaft clear of the casing wherein the latching means upon its forward face and upon the chuck member are engaged, the collar having a position shifted axially from its normal position wherein the latching means upon its rear face and upon the forward face of the casing are engaged, and spring means biasing the collar to its normal position.